Nov. 17, 1970     L. J. O'CONNELL     3,540,215
ROTARY COMBUSTION TURBINE ENGINE
Filed May 13, 1968     2 Sheets-Sheet 1
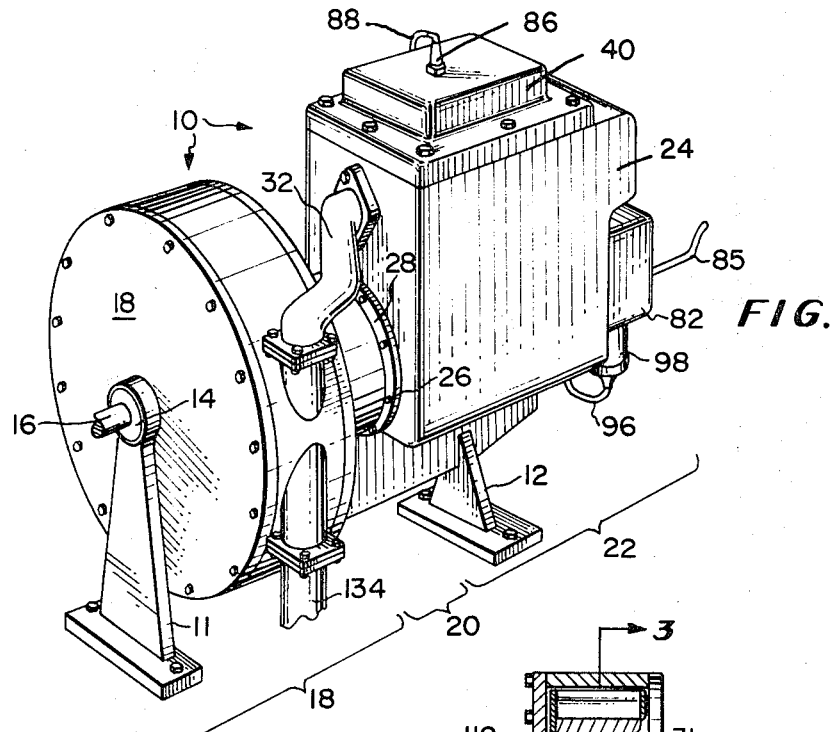
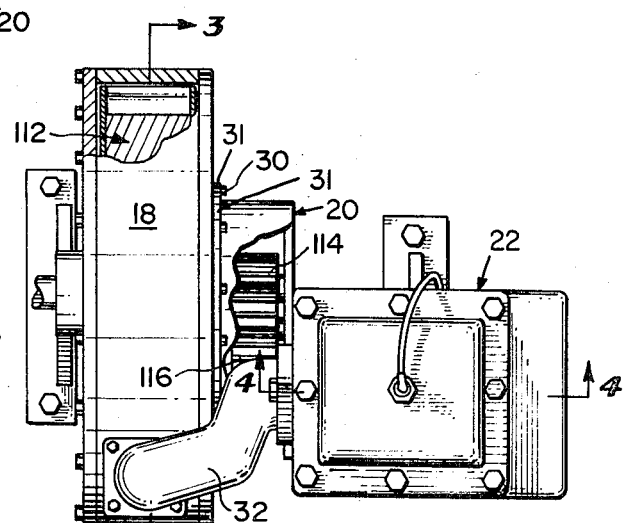
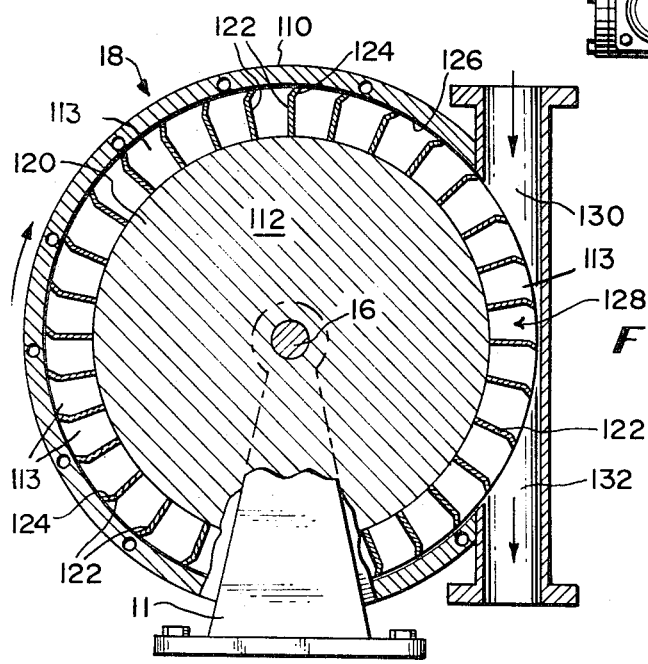
INVENTOR
LUKE J. O'CONNELL
By *Norman G. Blair*
Attorney

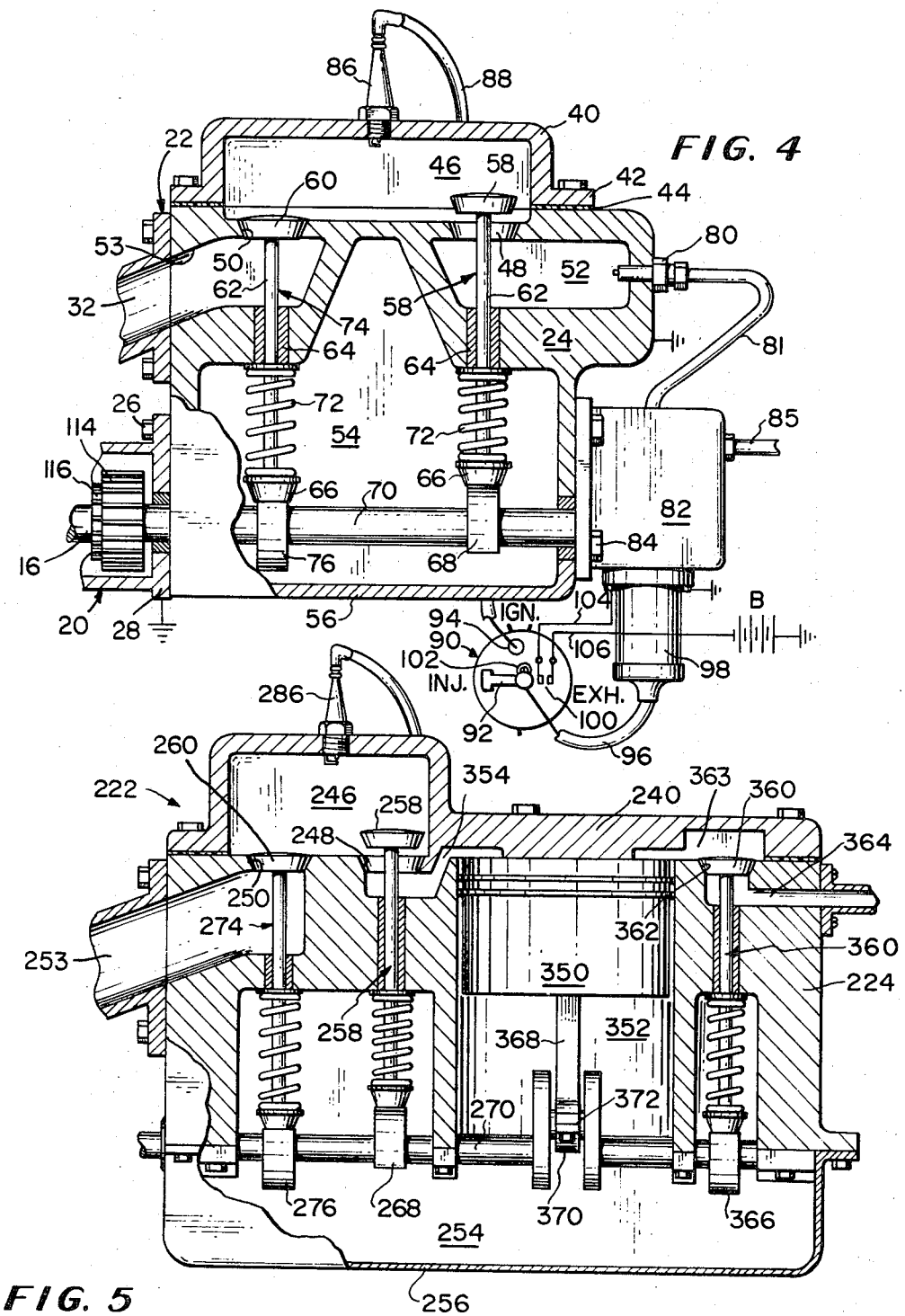

United States Patent Office 3,540,215
Patented Nov. 17, 1970

3,540,215
ROTARY COMBUSTION TURBINE ENGINE
Luke J. O'Connell, Chicago, Ill., assignor of one-half to
Thomas W. Havey, Chicago, Ill.
Filed May 13, 1968, Ser. No. 728,457
Int. Cl. F02c 7/00
U.S. Cl. 60—39.41
1 Claim

ABSTRACT OF THE DISCLOSURE

A rotary combustion turbine engine wherein, in one embodiment thereof, a combustible mixture is forcibly injected into a combustion chamber through a valve-equipped inlet port and is then ignited in the chamber, and the products of combustion are conducted from the chamber through a valve-equipped exhaust port and directed tangentially against a large diameter rotor in the peripheral region thereof. Annularly arranged shallow pockets in the periphery of the rotor and with closed sides confine the applied torque to the periphery so that a high mechanical advantage on the wheel and axle principle is attained for rotor driving purposes. In another embodiment, similar conditions of high mechanical advantage remain prevalent but the combustible mixture, instead of being forcibly injected into the combustion chamber, is drawn into a cylinder by way of the action of a piston, and during the return stroke of the piston, such gases are compressed and forcibly introduced through an open intake valve into the combustion chamber for subsequent ignition.

The present invention relates to rotary combustion turbine engines of the general type wherein the expansible products of combustion or exhaust gases resulting from the ignition of a combustible mixture within a combustion chamber are directed tangentially against a turbine rotor to drive the latter.

It is among the principal objects of the invention to provide an effective rotary combustion turbine engine which overcomes the disadvantages of reciprocating piston type internal combustion engines by eliminating the use of relatively massive reciprocating parts (pistons) against which the explosive force of combustion gases are directly applied and which, therefore, require the translation of linearly directed force into rotary motion and entail the counterbalancing of large masses which make abrupt direction changes.

In carrying out the invention by way of one form of engine, a combustible mixture is admitted under high pressure into a relatively small combustion chamber through an intake valve which remains open long enough to allow a high degree of pressure to build up in the chamber. When substantially fuel line or injection pressure has been attained in the combustion chamber, the combustible mixture is ignited and an exhaust valve opens, thus allowing the products of combustion, i.e., the expansible exhaust gases, to escape from the combustion chamber and be directed in tangential fashion against the periphery of a relatively large diameter turbine rotor. The rotor is of novel design and involves an annular series or radially extending vanes which are spaced circumferentially around the periphery of the rotor and with a pair of circular side plates define a series of shallow, close-sided pockets which are entirely confined in the peripheral region of the rotor. These vanes are successively subjected to the force of the expansible exhaust gases which is directed against them in a steadily flowing stream and in a direction which is at a right angle to each as it passes through the region of application of the gases. A turbine casing or stator substantially completely encloses the rotor and thus confines the exhaust gases to the vicinity of the vane-formed pockets so that there will be no leakage of gases away from the vicinity of the rotor and so that substantially all of the kinetic energy that is possessed by the expansible exhaust gases will be applied to the peripheral region of the rotor with practically no waste of such energy. The central region of the rotor within the confines of the circumferentially spaced and peripherally disposed vanes and pockets is solid and lends a flywheel effect to the rotor so that the momentum of the latter will carry the same in its rotational movement from one cycle to the next so that, after the peak of any given explosion has been encountered by the vanes, there will be no slowing-down of the rotor before the next following or succeeding explosion of gases becomes effective on the rotor. By such an arrangement, a smooth and substantially continuous rotary turbine rotor motion is attained.

The advantages of the turbine or periphery type engine such as has briefly been set forth above are manifold. Because of the fact that the turbine rotor is of large diameter and the area of contact of the rotor with the exhaust gases is confined entirely to the peripheral region of the rotor and in a tangential direction, a large torque and the principle of the wheel and axle is developed for driving the rotor, such torque being many times that which is developed when a crank arm action on a short radius is employed to transmit linear reciprocatory motion into rotary motion of a crankshaft as is the case with a conventional or standard internal or piston-type combustion engine. Due to the fact that explosively driven reciprocating parts which encounter abrupt direction changes are eliminated, counterbalancing weights are not required, while at the same time, vibrational forces are reduced to a minimum. Unlike a true turbine-type engine which relies for its operation upon a substantially continuous injection of a combustible mixture into a combustion chamber with a substantially continuous firing thereof so that the engine is non-cyclic in its operation, a timed intake and exhaust valve operation that is employed in connection with the present invention prevents the generation of back pressure in the combustion chamber which opposes or bucks the force of the income injected combustible gases.

In a modified form of the invention, the combustible mixture, instead of being injected directly into the combustion chamber through an open intake valve, is drawn into a cylinder by the descending intake stroke of a piston. On the return stroke of the piston, the combustible mixture is compressed and forced through the open intake valve into the combustion chamber, after which it is ignited and the explosive force of the products of combustion or exhaust gases are applied to the turbine rotor in the manner previously outlined in connection with the first mentioned form of the invention. By such an arrangement, an accurately measured volume of the combustible mixture is introduced into the combustion chamber during each compression stroke of the piston so that conventional throttle control employing a conventional carburetor may be employed for speed change purposes. In this latter form of the invention, since the reciprocating piston is not subjected to the direct action of the exploding gases, the vibrational effects that are applied to the engine create no particular problem since the involved parts are merely idling parts for the intake and compression of gaseous fuel only.

The provision of a rotary combustion turbine engine which is of simplified design and construction and, therefore, may be manufactured at a low cost; one which is possessed of a minimum number of parts, particularly moving parts, and, therefore, is unlikely to get out of order; one which is smooth and silent in its operation; one which is capable of ease of assembly and dismantlement for purposes of inspection, replacement, or repair of parts; one which, due to the isolation of the combustion chamber from the crankcase or oil reservoir of the engine so that the two do not oppose each other on the opposite sides of a moving piston, consumes but little lubricating oil; one which employs a greatly simplified timing mechanism for ignition purposes; one which may be operated upon low octane and, consequently, less expensive fuel; one which is light in weight and is substantially free; one which embodies but a single combustion chamber; and one which otherwise is well-adapted to perform the services required of it, are further desirable features which have been borne in mind in the production and development of the present invention.

Other objects and advantages of the invention, not at this time enumerated, will become readily apparent as the nature of the invention is better understood.

The invention consists in the several novel features which are hereinafter set forth and more particularly defined by claims at the conclusion hereof.

In the accompanying two sheets of drawings forming a part of this specification, two illustrative embodiments of the invention are shown.

In these drawings:

FIG. 1 is a perspective view of a rotary combustion turbine or periphery type engine embodying the preferred principles of the present invention;

FIG. 2 is a top plan view of the engine of FIG. 1, certain parts being broken away and other parts being shown in section in order more clearly to reveal the nature of the invention;

FIG. 3 is an enlarged vertical sectional view taken on the line 3—3 of FIG. 2 and in the direction of the arrows;

FIG. 4 is an enlarged horizontal sectional view taken on the line 4—4 of FIG. 2 in the direction of the arrows; and FIG. 5 is a sectional view similar to FIG. 4 but showing a modified form of the invention.

Referring now to the drawings in detail and in particular to FIGS. 1 and 2, a rotary combustion turbine or periphery type engine embodying the principles of the invention is designated in its entirety by the reference numeral 10 and involves in its general organization a pair of spaced apart standards 11 and 12, the standard 11 being provided at its upper end with a bearing support 14 for the horizontal output or drive shaft 16 of the engine. The engine includes a rear turbine section 18, an intermediate section 20, and a front combustion section 22 (see FIG. 4), the latter section being supported by the standard 12.

As best illustrated in FIG. 4, the front combustion section includes a block 24 which is preferably in the form of a casting and is secured to the intermediate section 20 by bolts 26 which pass through an outwardly extending rim flange 28 on the adjacent end portion of said intermediate section. This latter section is similarly secured to the rear turbine section by way of bolts 30 which project through an outwardly extending second rim flange 31 on the other end portion of the intermediate section of the block 24.

Briefly, in the operation of the engine 10, expansible exhaust gases resulting from the ignition of a combustible mixture of atomized gasoline (or other fuel) and air are first generated in the combustion section 22 and then conducted through an exhaust flow line 32 to the turbine section 18 where they act upon the peripheral region of a rotor on the output shaft 16 and thus rotate the latter for the performance of useful work, all in a manner that will now be described in detail.

The upper portion of the block 24 of the combustion section 22 of the engine 10 has associated therewith an upper combustion head 40 which is secured thereto by depending bolts 42, a suitable gasket 44 being interposed between the two parts. The block 24 and the head 40 define therebetween a combustion chamber 46 having at the bottom thereof an inlet port 48 and an outlet port 50. The inlet port 48 communicates with a fuel injection chamber 52 while the port 50 communicates with an exhaust passage 53 which is formed in the block 24. The latter is further provided with an enlarged lower oil chamber 54 which is closed at the bottom thereof by a suitable removable oil pan 56. An intake poppet valve 58 having an enlarged valve head 60 at its upper end and a depending valve stem 62 cooperates with the fuel inlet port 48 to open and close the same in a manner that will be described presently. The valve stem 62 of the intake poppet valve 58 projects downwardly and slidably through a bushing 64 into the oil chamber 54 and carries at its lower end a cam follower 66 which rides on an intake cam 68 on a horizontal cam shaft 70, while a helical compression spring 72 around the lower portion of the stem 62 yieldingly urges the valve 58 toward its closed position with respect to the intake port 48. An exhaust poppet valve 74, which is similar to the intake poppet valve 58, is similarly associated with the exhaust port 50, and in order to avoid needless repetition of description, identical reference numerals have been applied to the corresponding parts of such valve and its mountings in the block 24. The cam follower 66 on the lower end of the depending stem 62 of the exhaust poppet valve 74 cooperates with an exhaust cam 76 on the cam shaft 70. Due to the action of the two springs 72, the normal positions of the intake and exhaust valves are closed positions with respect to their respective associated ports 48 and 50.

The fuel injection chamber 52 is adapted to be supplied with a combustible mixture of gasoline or other fuel and air by means of an injection nozzle 80 which is connected by a fuel line 81 to the discharge side of a conventional compression and atomizing unit (not shown) which is disposed within a housing 82. The latter is secured by horizontal bolts 84 to the adjacent end wall of the block 24 and the aforementioned unit is suitably driven from the cam shaft 70. A liquid fuel supply line 85 extends into the housing 82 and serves to deliver fuel to said unit. A spark plug 86 is threadedly received in the upper combustion head 40 and is operatively connected electrically through a high tension lead 88 to a distributor 90. The latter is shown schematically in FIG. 4 and is adapted to be driven in timed relation to the speed of rotation of the cam shaft 70 and at one-half the speed of the latter or at any other ratio. The distributor 90 includes the usual rotor 92 which is adapted to sweep past a distribution contact 94 once during each rotation of the cam shaft 70 so that high voltage current which is applied to the distributor rotor through a second high tension lead 96 extending from a transformer coil 98 may be conducted to the spark plug 86 for firing purposes. Breaker points 100 cooperate with a cam lobe 102 once during each rotation of the distributor rotor 92 and are connected through low tension and ground leads 104 and 106, respectively, for periodically collapsing the field current in the usual manner of automative distributor and coil operation.

Referring now to FIGS. 2 and 3 of the drawings, the turbine section 18 of the engine 10 includes a turbine stator in the form of an outer and generally cylindrical casing 110, and in addition, an inner rotatable rotor 112. The latter is mounted on and fixedly connected to the output shaft 16 which, in turn, is operatively connected to drive the cam shaft 70 by means of meshing gears 114 and 116 in the intermediate section 20 of the engine 10. Instead of being driven by the gears 114 and 116, the cam shaft 70 may be driven by a belt and pulley connection or a chain and sprocket connection or it may be driven by way of a source of power independent of or separate from the turbine section 18 of the engine 10.

The turbine rotor 112 of the turbine section 18 of the engine 10 is in the form of a relatively large diameter wheel having a solid central circular section 120 from the periphery of which there project outwardly in radial fashion a large multiplicity of impeller vanes 122 having angularly turned distal edge flanges 124 which are inclined in the direction of rotation of the rotor as shown by the arrow in FIG. 3. Said vanes 122 form between them an annular series of pockets the sides of which are closed by way of the peripheral portions of a pair of fixed side plates 113 (see FIG. 2) on the sides of the rotor 112. The turbine stator 110 defines an inner cylindrical surface 126 around which the outer edges of the inclined vane flanges 124 sweep in circumferential fashion and in close proximity thereto.

The peripheral region of the turbine stator 110 is intersected by the rear end of the previously mentioned exhaust flow line 32 as clearly shown in FIGS. 1 and 3 and the tangential disposition of said exhaust flow line with respect to the generally cylindrical casing 110 of the turbine stator is such that exhaust gases passing in a substantially straight linear path through the flow line engage the trailing surfaces of the succesive vanes 122 in a region 128 of the stator casing 110 which will hereinafter be termed the impact region of the turbine section 18 of the engine 10, such region enveloping approximately 60° around the circumference of the turbine rotor 112. The expansible exhaust gases from the combustion chamber 46 enter the impact region 128 through an inlet port 130 and leave such region through an outlet port 132, from whence the expended gases may pass to the atmosphere through a discharge conduit 134 (see FIG. 1). As shown in FIG. 3 of the drawings, the angularly turned flanges 124 on the distal edges of the impeller vanes are, when the vanes are positioned between the inlet port 130 and the output port 132, spaced a small distance inwards of the central portion of the conduit which defines the inlet and outlet ports to the end that a portion of the gases entering the inlet port 130 is directly bypassed into the outlet port 132.

In the operation of the herein described rotary combustion turbine engine 10, liquid fuel which is introduced into the casing 82 through the fuel line 85 for admixture with air and compression of the thus combustible mixture is injected forcibly into the fuel injection chamber 52 (see FIG. 4). During the first quarter cycle of engine operation, the intake valve 58 opens and remains open while the exhaust valve 74 closes and remains closed. During this portion of the engine cycle, the combustible fuel mixture is, by reason of the inherent pressure therein, admitted to the combustion chamber 46 through the inlet port 48. The pressure of this fuel mixture progressively builds up to substantially injection pressure, after which, and at the commencement of the second quarter cycle of engine operation, the distributor rotor 92 sweeps past the distribution contact 94 so that high tension current is supplied to the spark plug 86 which then ignites the compressed combustible fuel mixture in the combustion chamber 46. At this instant, the exhaust valve 74 automatically opens and the explosive force of the ignited gases passes outwardly from the combustion chamber 46 through the exhaust passage 53 in the casting 24 and from thence it flows in a linearly directed stream through the exhaust flow line 32 to the stator casing 110 and specifically to the impact region 128 thereof. The flow of the products of combustion, i.e., the ignited gases to the impact region is augmented or assisted by the suction which is produced by the moving vanes in said impact region.

In the impact region 128 of the stator casing 110, these exhaust gases engage the various successive rotor vanes 122 in substantially broadside fashion and remain in contact therewith throughout approximately 60° of their circumferential travel around the stator casing. A major portion of the kinetic energy of the fast moving exhaust gases is delivered to the turbine stator and the expended exhaust gases then are exhausted to atmosphere through the aforementioned discharge conduit 134 without appreciable air pollution. It is to be particularly noted from FIG. 3 that portions of the ignited gases under pressure strike the angularly turned flanges 124 at right angles and, hence, impart a great amount of torque to the rotor. The exhaust valve 74 remains open and the intake valve 62 remains closed during both the second, third, and fourth quarter cycles of engine operation, thus giving ample time for all of the ignited gases to be driven from the combustion chamber 46 and clearing the chamber for reception of fresh fuel during the first quarter of the next succeeding cycle of engine operation.

It is to be noted at this point that peak operation of the turbine rotor 112 takes place shortly after the exhaust valve 74 opens and that torque application to the rotor decreases gradually toward the end of the engine cycle. However, due to the relatively great mass of the central body portion 120 of the rotor and the high kinetic energy that is developed in the rotor, a flywheel or wheel and axle action is exerted by the rotor which keeps it in motion with no appreciable slowing down thereof until the full force of the oncoming gases resulting from the next succeeding engine cycle is delivered to the impact region 128 of the stator casing 110. It is also to be observed that due to the relatively large diameter of the rotor, a comparatively great moment arm is involved for torque application from the periphery of the rotor to the central output shaft 16 on which the rotor is mounted.

Referring now to FIG. 5 wherein a modified form of rotary combustion turbine engine 210 is disclosed, the rear turbine section and the intermediate section remain substantially the same as in the previously described engine 10, the modification being concerned only with the front combustion section 222. Only this latter section of the engine is illustrated herein, and in order to avoid needless repetition of description, corresponding reference numerals but of a higher order are applied to the corresponding parts as between the combustion chamber and camshaft arrangements of FIGS. 5 and 4.

In the engine 210, direct fuel injection into the combustion chamber 246 is eliminated and maximum pressure of the combustible mixture in the chamber is not dependent upon injection pressure, but rather, it is a forced pressure that is attained by the compressive action of a vertically slidable piston 350 which is reciprocable in a cylinder 352 in the block 224. The front combustion section 222 comprises a housing in the form of a block 224 and a superposed head 240. The combustion chamber 246 is formed in the head 240 and communicates with the upper end of the cylinder 352 through an intake passage 254 which communicates with an intake port 250 the latter cooperating with a spring-closed, vertically movable inlet valve 258. The cylinder 352 is positioned immediately to one side of the combustion chamber 246 and as shown in FIG. 5 its effective volumetric capacity is greater than the combined volumetric capacity of the combustion chamber 246 and the inlet passage 254. A spring-closed, vertically movable valve 360 cooperates with a fluid inlet port 362, the latter being disposed between and in communication with a fuel inlet chamber 363 and a fuel passage 364. The fuel inlet chamber 363 extends between the inlet port 362 and the upper end of the cylinder 352 and is formed in the head 240, and the fuel passage 364 is adapted to be connected to a conventional carburetor (not shown) by means of which a combustible fuel mixture is made available. The valve 360 and its mountings are similar to the intake valve 258. The valve 360 is operable under the control of a cam 366 on a single rotary camshaft 270 which extends horizontally and is journalled in the block 224 beneath the cylinder 352. The piston is provided with a connecting rod 368, the lower end of which is provided with a bearing assembly 370 which is operatively supported on an eccentric crank pin 372 on the cam shaft 270. The intake valve 258 is operable under control of a cam 268 on the camshaft 270. The aforementioned combustion chamber 246 has associated with it an exhaust port which exhausts into an exhaust flow line 253. The latter extends from said exhaust port to the turbine motor. Said exhaust port cooperates with a spring-closed, vertically movable exhaust valve 274, such valve being operable under the control of a cam 276 on a single camshaft 270.

As shown in FIG. 5, the cam 276 for the vertically movable exhaust valve 276 is such that said exhaust valve is maintained open for a predetermined period while the intake valve 258 remains closed thereby allowing purging of the combustion chamber 246 by a suction effect which is created by the rotor-vanes during rotation of the rotor.

In the operation of the engine 210, during the first quarter cycle of engine operation, the inlet valve 360 automatically opens and remains open during descent of the piston 350 in the cylinder 352 so that the combustible mixture from the aforementioned carburetor is through the fuel chamber 363 and into the cylinder from the fuel passage 364. At this time, the intake valve 258 associated with the combustion chamber 246 remains closed. At the commencement of the second quarter of the engine cycle, the inlet valve 360 closes while the intake valve 258 opens and then remains open. During this second quarter cycle, the piston moves upwardly and forces the gaseous fuel mixture in the cylinder 352 into the combustion chamber via the passage 254, the exhaust valve 274 at this time being closed. This upward movement of the piston 350 not only transfers the mixture from the cylinder to the combustion chamber 246, but it serves to compress the mixture within said combustion chamber. At the commencement of the third quarter cycle of engine operation, the intake valve 258 closes, while the exhaust valve 274 opens. At the same time, ignition takes place in the combustion chamber 246 by means of the spark plug 286 with the result that the explosive force of the ignited gases are automatically forced from the combustion chamber 246 for rotor operating purposes in the same manner previously described in connection with the engine 10. Application of torque to the turbine rotor under the influence of the thus expelled expansible exhaust gases continues during the remainder of the engine cycle. During this latter half of the engine cycle, the inlet valve 360 will remain closed, the piston 350 traveling downwards and then upwards without function while the exhaust gases are being expelled from the combustion chamber 246.

Having thus described the invention what I claim as new and desire to secure by Letters Patent is:

1. A cyclically operable rotary combustion turbine including a stator casing and a vane-equipped rotor mounted for rotation in the casing, an engine housing disposed adjacent to the stator casing, said housing providing a combustion chamber having a fuel intake port and an exhaust port, a spring-closed, vertically-movable intake valve for said intake port, a spring-closed, vertically-movable exhaust valve for said exhaust port, a vertically-disposed cylinder formed in said housing and disposed immediately to one side of the combustion chamber, an intake passage formed in the housing and extending between the upper end of the cylinder and said intake port, the effective volumetric capacity of said cylinder being greater than the combined volumetric capacity of the combustion chamber and the intake passage, a fuel inlet chamber formed in the housing adjacent to the upper end of the cylinder and having an inlet port, a spring-closed, vertically-movable inlet valve for said inlet port, a fuel passage formed in said housing, leading to said inlet port, and adapted to be connected to a carburetor for reception of a combustible fuel mixture therefrom, a piston vertically slidable in said cylinder, a single horizontally extending camshaft journalled in the housing beneath said combustion chamber and cylinder, means operatively connecting said camshaft to the rotor in driven relationship and having cams thereon for direct cooperation with said intake valve, exhaust valve, and inlet valve, respectively, a crank arm formed on said camshaft and operatively connected to the piston so as to impart successive up and down strokes thereto in response to rotation of said camshaft, means establishing an exhaust flow line between said exhaust port and the rotor to effect rotation of the latter, and ignition means effective upon energization thereof under the control of said camshaft for igniting a combustible fuel mixture in the combustion chamber, said camshaft being operable upon each rotation thereof to effect an initial opening of the inlet valve in order to admit a combustible fuel mixture from said fuel passage to the fuel inlet chamber during downstroke of the piston for admission to said cylinder, thereafter to effect conjoint closing of said inlet valve and opening of the intake valve in order that the piston during its upstroke forces the accumulated fuel mixture from the cylinder into the combustion chamber via said intake passage during upstroke of the piston, and thereafter following closing of the intake valve to energize said ignition means and effect opening of said exhaust valve so as to allow the expanded exhaust gases to escape from the combustion chamber through said exhaust port and exhaust flow line and effect rotation of the turbine rotor, said exhaust valve under control of its respective cam on the camshaft being maintained open for a predetermined period to allow purging of the combustion chamber by a suction effect created by the vanes of the rotor during rotation of the rotor.

References Cited

UNITED STATES PATENTS

| | | | |
|---|---|---|---|
| 864,821 | 9/1907 | Zoelly | 60—39.76 XR |
| 1,043,254 | 11/1912 | Russell | 60—32 |
| 1,073,717 | 9/1913 | Stachel | 60—39.76 XR |
| 1,342,314 | 6/1920 | Linderdahl | 60—39.75 XR |
| 1,357,993 | 11/1920 | Kemmer | 60—39.75 XR |
| 2,037,538 | 4/1936 | Ritchie | 60—39.75 |
| 2,304,136 | 12/1942 | Woods | 60—39.75 XR |
| 2,990,685 | 7/1961 | Hoover | 60—39.78 XR |

FOREIGN PATENTS 638,735  2/1928  France.

CARLTON R. CROYLE, Primary Examiner

U.S. Cl. X.R.

60—39.75, 39.81